United States Patent
Goursolas et al.

[15] 3,691,514
[45] Sept. 12, 1972

[54] METHOD AND APPARATUS FOR DETERMINING THE DIRETION OF PROPAGATION OF A PLANE WAVE

[72] Inventors: Anne-Marie Jeanne Goursolas, Paris; Andre Simon Georges Lambert, Fresnes, both of France

[73] Assignee: Societe Alsacienne De Construction Atomiques De Telecommuncations et D'Electronique "alcatel" Paris, France

[22] Filed: June 16, 1970

[21] Appl. No.: 46,667

[30] Foreign Application Priority Data

June 16, 1969 France.....................6920024

[52] U.S. Cl.................340/6 R, 340/16 R, 343/113 R
[51] Int. Cl..............................................G01s 3/00
[58] Field of Search...........340/6 R, 16 R; 343/113 R

[56] References Cited

UNITED STATES PATENTS 3,163,844  12/1964  Martin.......................340/6 R
3,292,177  12/1966  Brightman et al..........340/6 R
3,449,711  6/1969   Ricketts, Jr. et al........340/6 R

FOREIGN PATENTS OR APPLICATIONS 1,025,466  4/1966  Great Britain.............340/6 R Primary Examiner—Richard A. Farley
Attorney—Sughrue, Rothwell, Mion, Zinn and Macpeak

[57] ABSTRACT

A method and apparatus for determining the direction of propagation of a plane wave, wherein the analog signals occuring at preselected time intervals from a plurality of detectors spaced along a predetermined direction are converted to digital signals. The difference between the aggregated value of the digital signals of the detected wave and a wave in the predetermined direction providing an indication of the deviation of the path of the wave from the predetermined direction.

8 Claims, 7 Drawing Figures

PATENTED SEP 12 1972 3,691,514

METHOD AND APPARATUS FOR DETERMINING THE DIRETION OF PROPAGATION OF A PLANE WAVE

The present invention relates to the determination of the direction of propagation of a plane wave.

For determining the direction of propogation of a plane wave in an isotropic medium, a frequently used method consists in checking whether the wave is being propagated along a predetermined direction, or along one of several predetermined directions.

Generally a group of detectors is used each providing an analog signal whose amplitude varies with time. Each signal is delayed by a time interval chosen to compensate for the propagation time of a plane wave between the detectors of the group when travelling along the predetermined direction, so that for a wave travelling in this direction the delayed signals are all coincident.

The delayed signals are combined and monitored, and the values obtained for each predetermined direction are compared, the maximum value corresponding to the predetermined direction nearest to the actual direction of propagation of the wave in question.

It has been proposed to improve this method by using digital techniques rather than analog techniques. Accordingly, the signal from each detector is clipped and periodically sampled in the form of binary coded pulses. The analog delay lines previously used have been replaced by digital delay lines, in the form of shift registers for example.

The period of time between the switching of two successive stages of the shift register defines the degree of precision of the delay, and consequently the accuracy of the coincidence of the signals, as well as the period for which each signal is sampled. In choosing this time interval, a compromise is made between the required degree of precision and the sampling period required.

However, it has not heretofore been possible to reduce the number of delay lines required. Moreover, where the signals are classified according to their amplitudes, the number of delay lines required is multiplied by the number of classification levels.

To obtain a high degree of precision, it is necessary to use a large number of detectors spread out in as great a volume as possible, possibly on a plane surface. It is also necessary to control very precisely the delays. This can be done, for example, by increasing the number of stages of each shift register while at the same time diminishing the sampling interval so as not to change the maximum delay available from the shift register. Thus the shift register used must have a large number of stages and a shift register must be provided for each of the large number of detectors.

It is therefore an object of this invention to provide a method of determining the direction of propagation of a plane wave by aggregating digital signals from wave detectors spaced along a predetermined direction during preselected time intervals, such that a given point in a plane wave travelling in the predetermined direction will pass the successive detectors at the start of the intervals. The difference between the aggregated value for a given wave and that for a wave travelling in the predetermined direction providing an indication of the deviation of the path of the given wave from the predetermined direction.

It is another object of this invention to provide an apparatus for determining the direction of propagation of a plane wave, comprising wave detectors spaced along a predetermined direction, and a first circuit for providing from each detector a digital signal significant of the detector output. The apparatus also has a second circuit for transmitting the digital signals to an aggregating circuit during preselected time intervals, such that a given point in a plane wave travelling in the predetermined direction will pass the successive detectors at the start of the intervals.

In order to obtain the maximum amount of information from the signals provided by the detectors it is necessary to provide outputs at a higher frequency than that resulting from the propagation time of a plane wave from the first to the last detector. Also, the detectors are preferably grouped so as to form sequences spaced along more than one predetermined direction, first and second circuits being provided for each direction.

In a preferred embodiment of the invention, the detectors for each predetermined direction are divided into N successive sub-groups, corresponding to successive and equal lengths along that predetermined direction. The shift register carries out N cycles during the period taken by a plane wave travelling in that predetermined direction to travel from the first detector to the last detector.

In this preferred embodiment, an aggregating circuit is provided for each sub-group and the N aggregating circuits are connected in series. At the end of each cycle of the shift register the aggregated value of the kth aggregating circuit is transferred into the $(k + 1)$ aggregating circuit.

The invention will now be described in more detail, by way of examples only, with reference to the accompanying diagrammatic drawings, in which.

Figure 1:
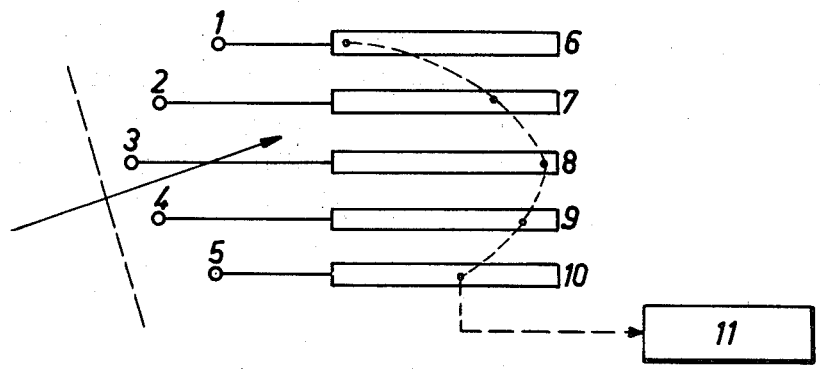
FIG. 1 is a block diagram of prior art apparatus for determining the direction of propagation of a plane wave.

The known system of FIG. 1 comprises five detectors 1, 2, 3, 4, 5 connected to the inputs of respective delay lines 6, 7, 8, 9, 10. Outputs of the delay lines are connected to an adding circuit 11. The arrow and straight dotted line in FIG. 1 show respectively a predetermined direction of propagation and a plane wave travelling in that direction. It will be seen from FIG. 1 that the detector 2 will be reached by the plane wave shortly before the detector 1. This time difference is compensated for by the delay lines. The curved dotted line connects the outputs of various delay lines to the adding circuit 11. The output of line 7 is further along the delay line than that of line 6, and the distance between them is such that the signals from detectors 1 and 2 arrive simultaneously at the circuit 11 even though they are successively generated.

Figure 2:
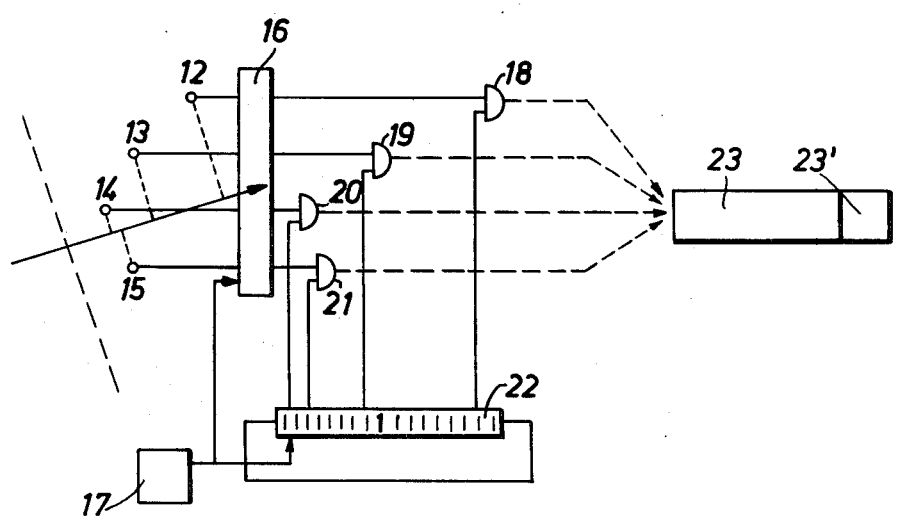
FIG. 2 is a block diagram of the apparatus of the present invention.

FIG. 2 is the apparatus of the present invention for detecting the direction of propagation of a plane wave. The apparatus has four detectors 12, 13, 14, 15. The arrow and dotted line again represent a predetermined direction of propagation and a plane wave travelling along that direction. A coder 16 is controlled by an electronic clock circuit 17, and has one output corresponding to each detector. The outputs of coder 16 are connected respectively to the first input of AND-gates 18, 19, 20, 21. The second inputs of the AND-gates are connected to preselected stages of a shift register 22 driven by the clock circuit 17 and having its output connected to its input so that it continues to cycle indefinitely. An adding circuit 23 is connected to a signal processing circuit 23' which comprises a rectifier and integrator circuit.

In operation, for a plane wave propagating along the predetermined direction shown by the arrow, the detectors 14, 15, 13 and 12 are excited in that order and each provides an analog signal which varies with time. The coder 16 converts each of these analog signals to a digital signal consisting of coded pulse trains at a repetition frequency determined by the clock circuit 17. The pulses are binary coded and the digital signals consist of successive binary codes representing the instantaneous amplitude of the signals from the respective detectors.

The shift register 22 is arranged so that at any one time, one of its stages which comprises a bi-stable circuit, is in a first state or ON while all the remaining stages are in their second state or OFF. The stages are successively switched ON and OFF at intervals determined by the clock circuit 17, so that output of each stage is successively energized at equal intervals. The time interval which each stage remains ON is sufficient for the transfer of a digital code from the coder 16 to the adding circuit 23.

Thus each of the AND-gates 18, 19, 20, 21 is gated on for this time period determined by the stage of the shift register to which its input is connected. It will be seen from FIG. 2 that the gates are gated on in the order 20, 21, 19, 18, with a relatively short interval between the operating of gates 20 and 21, a slightly longer interval between the operating of gates 21 and 19, and a longer interval between the operating of gates 19 and 18.

The times at which the gates are opened are so chosen by selecting the appropriate stages of the register 22. The signals obtained from the AND-gates during a cycle of the shift register 22 when a plane wave is travelling in the predetermined direction are all from the same wavefront.

The adding circuit 23 evaluates the algebraic sum of the codes which it receives during each cycle of the shift register 22, and transfers to the processing circuit 23' a sequence of such sums.

With this arrangement, the closer the actual direction of propagation of a wave is to the predetermined direction the greater is the value obtained by rectifying and integrating the signals applied to the circuit 23'.

In the description above, it has been assumed that the codes were in the form of sequential pulses in pulse trains. The invention is also applicable to a coding system where the pulses are in parallel. In this case, a single shift register still suffices, but each stage would be connected to as many AND-gates as there were bits in each code, each AND-gate receiving one of the bits. In other respects, the operation would remain identical.

The arrangement shown in FIG. 2 is associated with a single predetermined direction. When a number of predetermined directions are used, several devices such as that shown in FIG. 2 are provided, one for each of the predetermined directions. All the devices use the same detectors, the same coder, and the same shift register. An adding circuit is provided for each direction, all the circuits being connected to a common output circuit arranged to compare the signals received from the various adding circuits. From this comparison it is determined which of the predetermined directions is closest to the actual direction of propagation of the wave in question.

Figure 3:
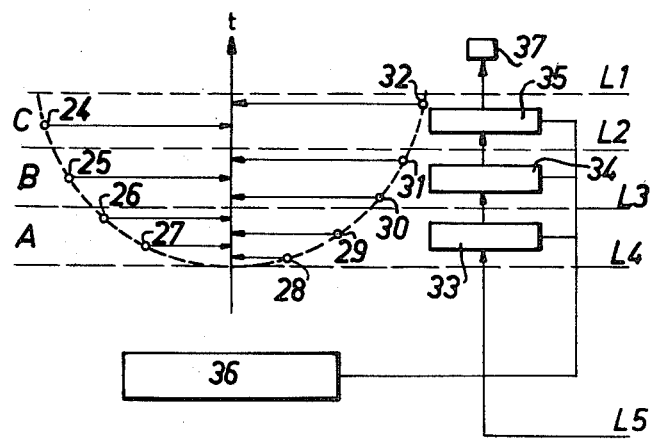
FIG. 3 shows a first arrangement of detectors of the apparatus corresponding to a first direction of propagation.

Referring to FIG. 3, nine detectors 24–32 are shown with an arrow showing a predetermined propagation direction. The detectors are divided into three sub-groups A, B, C divided by lines perpendicular to the arrow and equally spaced along it. Sub-groups A, B and C comprise respectively the detectors 28, 27, 29 and 26; 30, 25 and 31; and 24; and 32. The detectors of each sub-group are connected to respective adding circuits 33, 34, 35 by an arrangement such as that shown in FIG. 2. The common shift register 36 is connected to the three adding circuits.

Figure 4:
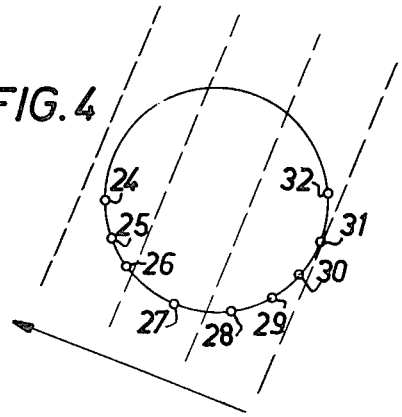
FIG. 4 shows the same detectors in relation to a second direction of propogation.

FIG. 4 shows the same detectors 24–32 with an arrow indicating another predetermined direction of propagation. The dotted lines perpendicular to the arrow divide the detectors into three groups, detectors 31, 30, 32, 29 and 28 in the first group; 27 in the second; and 24, 25 and 26 in the third.

The detectors are connected to respective aggregating circuits not shown in the Figure, but identical to those of FIG. 3.

Figure 5:
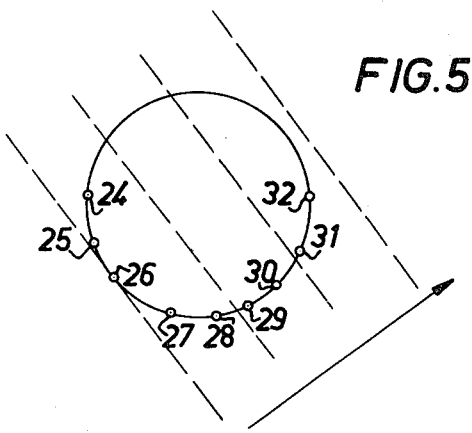
FIG. 5 shows the same detectors in relation to a third propagation direction.

FIG. 5 shows again the same detectors with a third predetermined direction of propagation. The detectors are divided into three groups comprising respectively detectors 24, 25, 26, 27 and 28; 29 and 30; and 31; and 32. The detectors are connected to further aggregating circuits not shown in the Figure but identical to those of FIG. 3.

Referring again to FIG. 3, the binary coded signals from the detectors of each sub-group are combined in their respective aggregating circuit in a similar way to that of the circuitry shown in FIG. 2. Initially, when there is no planewave present, the voltages at the outputs of the detectors and at the outputs of the aggregating circuits are 0. The further operation of the circuitry of FIG. 3 will be described with reference to FIG. 7, which is a time diagram with the time axis horizontal and extending from left to right. The lines $L_1$ to $L_4$ are analogous to those of FIG. 3, and each of the three spaces between pairs of lines is used to display the value in the particular aggregating circuit.

Figure 7:
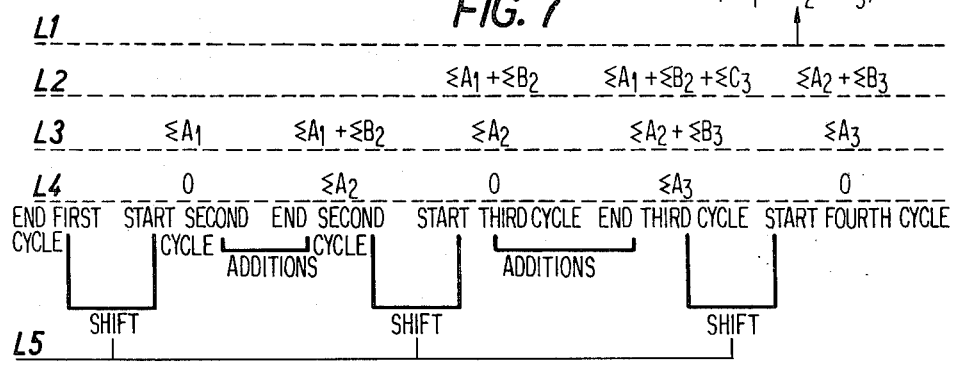
FIG. 7 is a time diagram relating to the operation of the circuitry shown in FIG. 6.

When a planewave reaches the first sub-group A, the detectors 28, 27, 29 and 26 are activated in that order, and the voltages which appear at their outputs are added up in the aggregating circuit 33. The corresponding total $\Sigma A_1$ is that developed during the first cycle of the shift register 36. FIG. 7 begins at the end of this first cycle, at which time the sum $\Sigma A_1$ is transferred into the aggregating circuit 34 and aggregating circuit 33 is reset to 0. Referring to FIG. 7 it will be seen that at the beginning of the second cycle of register 36 the sum $\Sigma A_1$ appears between lines $L_2$ and $L_3$ and a 0 appears between lines $L_3$ and $L_4$. During the next cycle of shift register 36, circuit 33 aggregates to a new sum $\Sigma A_2$. At the same time, circuit 34 aggregates to a sum $\Sigma B_2$ which is added to the sum $\Sigma A_1$ already present. At the end of the second cycle of shift register 36 the respective sums of circuits 34 and 33 are transferred to circuits 35 and 34. Thus, at the beginning of the third cycle of shift register 36, the sum $\Sigma A_1$ plus $\Sigma B_2$ appears between lines $L_1$ and $L_2$ of FIG. 7, and the sum $\Sigma A_2$ appears between lines $L_2$ and $L_3$. 0 appears between lines $L_3$ and $L_4$. During the fourth cycle, circuit 33 aggregates to a sum $\Sigma A_3$; circuit 34 aggregates to a sum $\Sigma B_3$; and circuit 35 aggregates to a sum $\Sigma C_3$. These sums are added to those already present in circuits 35 and 34, so that at the end of the third cycle the total sums in circuits 33, 34 and 35 are respectively $\Sigma A_3$, $\Sigma A_2 + \Sigma B_3$, and $\Sigma A_1 + \Sigma B_2 + \Sigma C_3$. The sum of each circuit is then transferred into the next succeeding circuit, and that of circuit 35 is transferred into processing circuitry 37.

Figure 6:
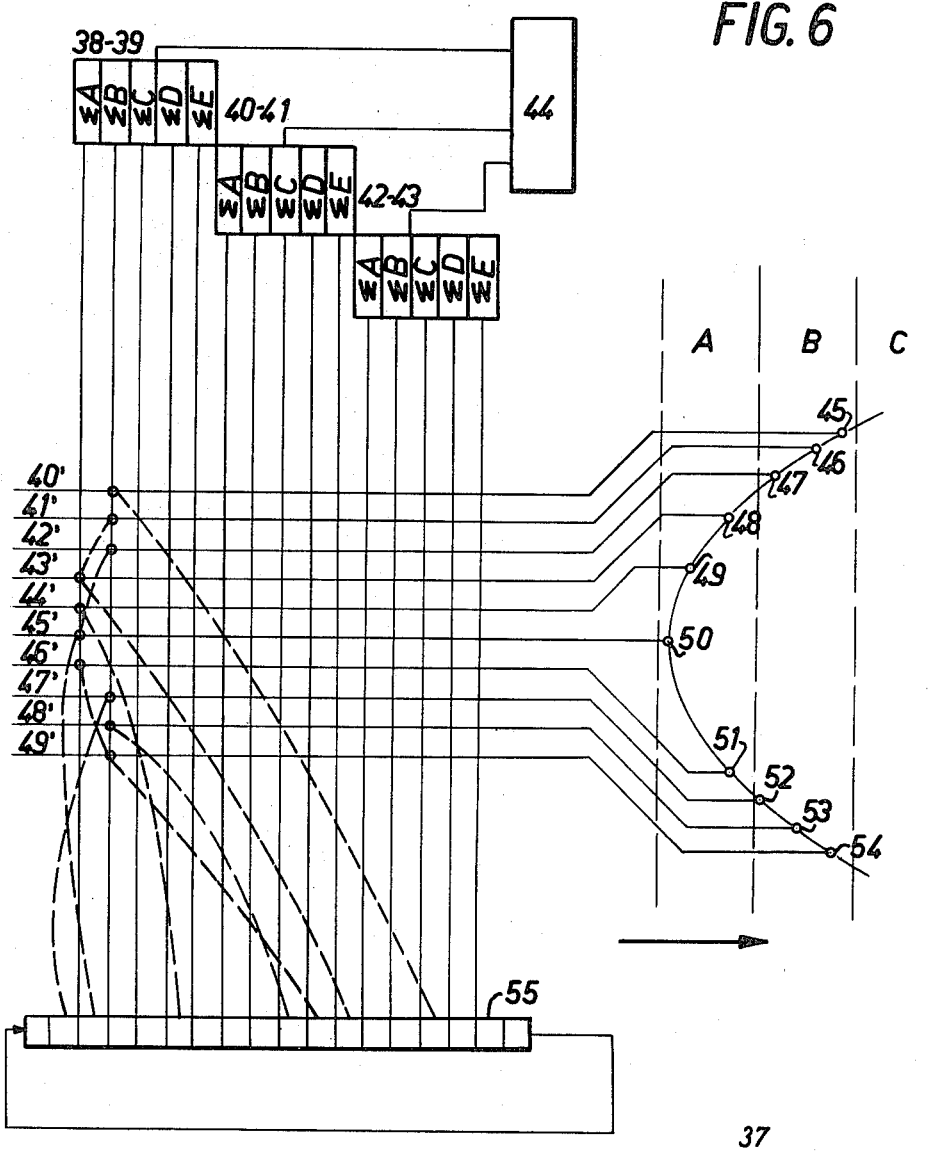
FIG. 6 shows another form of the apparatus.

Referring now to FIG. 6, a form of apparatus using three predetermined directions is shown. Each direction has its own assembly of aggregating circuits, the first two circuits of the first assembly being indexed 38 – 39, and the first two circuits of the next two assemblies being indexed 40 – 41 and 42 – 43 respectively.

The three groups of aggregating circuits are connected to respective inputs of a processing unit 44 which indicates the predetermined direction providing the greatest output value from its aggregating circuits. The greatest value is the one closest to the propagation direction of the wave being investigated.

The vertical lines represent connections from the unique shift register 55 to the inputs of the various aggregating circuits. The detectors 45 to 54 are provided with analog to digital convertors (not shown) which convert the detector outputs into digital signals which are applied to the aggregating circuits. The output connections from the detectors and convertors are shown by horizontal lines crossing the vertical lines between the register 55 and aggregating circuits. The circles at the intersections of vertical and horizontal lines represent gates which, when gated on, connect the associated detector to the corresponding aggregating circuit. The dotted lines running from the gates to divisions of the register 55 represent connections to the control inputs of the gates, which are energized when the corresponding stages of the shift register 55 are ON.

The shift register 55 has its output connected to its input and performs one cycle in the time required for a planewave to pass across one of the three sections of space A, B or C in which the detectors are situated.

FIG. 6 shows only the connections for one of the predetermined directions of propagation. The other directions use the same detectors connected to the respective aggregating circuits by further gates such as those in FIG. 6. Furthermore, while only three spaces A, B and C are shown in FIG. 6, the number can be expanded. An aggregating circuit for each sub-group evaluating the successive sums $\Sigma A, \Sigma B, \Sigma C, \Sigma D, \Sigma E$.

In the arrangement shown in FIG. 6, detectors 48, 49 50, 51 are in sub-group A and are connected to aggregating circuit 38 which evaluates the sum $\Sigma A$. Detectors 45, 46, 47, 52, 53, 54 are in sub-group B and are connected to aggregating circuit 39 which evaluates the sum $\Sigma B$.

The operation of the circuitry of FIG. 6 is in other respects substantially the same as that of FIG. 3.

Apparatus such as just described can be used for the detection of many kinds of natural vibrations. In particular the apparatus is useful in seismography as it enables reflective planes to be easily located giving an indication of changes in the type of ground.

Also, the apparatus can be used for direction finding by detecting soundwaves from mobile or stationary sources such as army vehicles, for example.

What is claimed is:

1. A method of using a plurality of detectors to determine the direction of propagation of a plane wave by detecting said plane wave in a plurality of predetermined directions and comparing the detected plane wave to the value of plane waves travelling along said predetermined directions, said method comprising the steps of:

a. dividing for each predetermined direction the area occupied by said plurality of detectors into a plurality of sections, each section being of equal length along a line perpendicular to the predetermined direction such that said plurality of detectors is divided into N sub-groups, each sub-group occupying one section;

b. dividing the propagation time of the plane wave from the beginning of the first section to the end of the last section into N intervals;

c. detecting with said plurality of detectors the instantaneous analog amplitude of said plane wave;

d. converting said analog amplitude to a digital signal representative of said analog signal;

e. sampling the digital signals from each detector for each predetermined direction at an instant of time when a plane wave travelling in the predetermined direction would be at that detector;

f. combining in a plurality of aggregating devices, one aggregating device corresponding to each sub-group for each predetermined direction, the sampled digital signals for each of the sub-groups for each predetermined direction;

g. shifting at the end of each time interval the combined signal in each aggregating device into the aggregating device of the next sub-group of the same predetermined direction; and h. producing an output signal when the combined data is shifted out of the last aggregating device.

2. Apparatus for determining the direction of propagation of a plane wave by comparing it to the value of a plane wave in a predetermined direction, said apparatus comprising:

a. a plurality of detectors, for detecting the value of said plane wave grouped into a plurality of sub-groups, the sub-groups being formed in parallel sections of equal length along a predetermined direction;

b. first circuit means for converting the analog output of each of said detectors to a digital signal corresponding to said detector outputs;

c. a plurality of aggregating circuit means corresponding to each of said sub-groups for aggregating the digital signals of all of the detectors in the corresponding sub-groups; and d. second circuit means for coupling the output of said first circuit means to a corresponding aggregating circuit means at instants of time corresponding to the time when a plane wave travelling along said predetermined direction would be at each detector.

3. The apparatus as set forth in claim 2 wherein said second circuit means comprises:

a. timer circuit means for providing switching signals at said instants of time; and b. gate means including one gate for each of said detectors wherein each gate receives a switching signal at one of said instants of time corresponding to the instant when a plane wave travelling along said predetermined direction would be at the corresponding detector, wherein upon the receipt of a switching signal said gate means passes the instantaneous digital value corresponding to the analog value detected by said corresponding detector to said aggregating means.

4. The apparatus as set forth in claim 3 wherein said time circuit means comprises a. a shift register including a plurality of serially connected bistable circuits, wherein the output of the last stage of the shift register is connected to the input of the first stage, said shift register cycling through a number of cycles equal to the number of sub-groups during the time taken by a plane wave travelling in said predetermined direction to travel from the first detector to the last detector; and b. clock means for driving said shift register.

5. The apparatus as set forth in claim 4 wherein said digital signal corresponds to the instantaneous amplitude of said plane wave at said detector.

6. The apparatus as set forth in claim 2 further including means for changing the detectors forming a sub-group thereby forming different sub-groups spaced along a plurality of predetermined directions, wherein said first and second circuit means are provided for each predetermined direction.

7. The apparatus as set forth in claim 6 wherein said gate means includes a gate for each of said detectors in each of said predetermined directions.

8. The apparatus as set forth in claim 4 wherein said aggregating circuit means are connected in series such that at the end of each cycle of said shift register the aggregated value of each aggregating circuit is transferred to the succeeding aggregating circuit means and becomes the initial value of that aggregating circuit means for the succeeding cycle of said shift register.

* * * * *